United States Patent [19]

Schmitz et al.

[11] Patent Number: 4,464,056

[45] Date of Patent: Aug. 7, 1984

[54] MIXING HEAD FOR REACTIVE MATERIALS

[75] Inventors: Horst Schmitz, Munich; Wolfgang Krompass, Inning, both of Fed. Rep. of Germany

[73] Assignee: Krauss-Maffei Aktiengesellschaft, Munich, Fed. Rep. of Germany

[21] Appl. No.: 381,740

[22] Filed: May 24, 1982

[30] Foreign Application Priority Data

May 22, 1981 [DE] Fed. Rep. of Germany ....... 3120482

[51] Int. Cl.³ .............................................. B01F 5/04
[52] U.S. Cl. ..................................... 366/134; 366/189; 366/193; 222/309; 422/131; 425/205
[58] Field of Search .................. 222/255, 278, 309; 264/328.6; 366/134, 159, 176, 184, 189, 193, 332, 333, 334; 422/131, 135, 133; 425/149, 205, 207, 376 A, 543, 561; 137/625.4, 625.48

[56] References Cited

U.S. PATENT DOCUMENTS

| | | | |
|---|---|---|---|
| 3,182,971 | 5/1965 | Wakeman et al. | 366/332 |
| 3,975,128 | 8/1976 | Schlüter | 425/200 |
| 4,418,041 | 11/1983 | Johnson et al. | 366/159 |

FOREIGN PATENT DOCUMENTS

| | | |
|---|---|---|
| 1501814 | 2/1978 | United Kingdom . |
| 1550082 | 8/1979 | United Kingdom . |
| 2086747 | 5/1982 | United Kingdom . |

*Primary Examiner*—Robert W. Jenkins
*Assistant Examiner*—Arthur D. Dahlberg
*Attorney, Agent, or Firm*—Karl F. Ross; Herbert Dubno

[57] ABSTRACT

A mixing head for two reactive components forms a mixture in a mixing chamber when a control plunger is retracted, the mixture passing into a channel at right angles to the mixing chamber. A second plunger in the channel is partially retracted so that its free end is positioned in line with the opening to form a partial obstruction around which the mixture is formed. Then the second plunger is retracted to allow clearing of residues, and advanced to drive residues from the channel.

9 Claims, 2 Drawing Figures

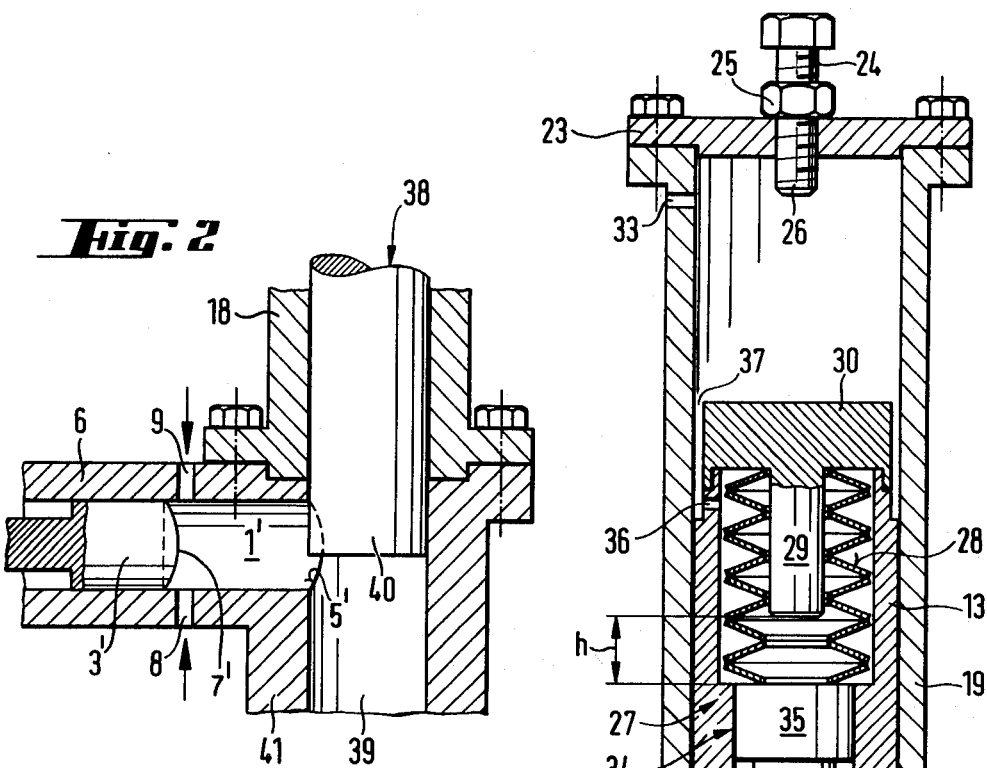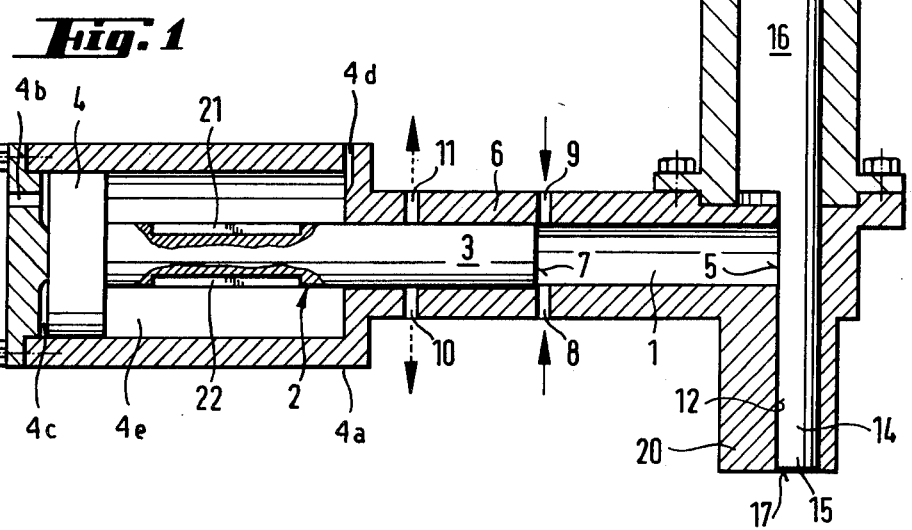

MIXING HEAD FOR REACTIVE MATERIALS

Field of the Invention

Our present invention relates to a mixing head for chemically reactive components of a reaction mixture and especially components of a synthetic resin mixture which are adapted to react in a setting-type, polymerization or cross-linking reaction. More particulary, the invention relates to a mixing head of the kind which utilizes a mixing chamber from which material is displaced by a plunger, ram, or piston.

Background of the Invention

In the commonly owned U.S. Pat. Nos. 3,799,199, 3,975,128, 3,706,515, 3,954,926 and 4,226,543 and the publications cited below, systems have been described for bringing about the mixture of two or more reactive components in a mixing chamber prior to or concurrently with the expulsion of said materials into another vessel, e.g. a mold.

In the production of polyurethane, for example, a diisocyanate or polyisocyanate component is reacted with a diol or a polyol component to produce the settable reaction mixture by separately feeding these components into a mixing chamber and displacing the intimately formed mixture from the chamber into a mold in which the mixture can set. Such mixing heads also may be utilized for the dispensing of the reacting mixture for other purposes as well.

In general, the conditions under which the two components are mixed require that the two components be held separate from one another until the instant at which they enter the mixing chamber since any premature contact of the two components with one another will result in setting. Such premature contact may result in the reaction of the two components to form a hardenable mass obstructing further outflow of one or both of the components or the mixture. In order to prevent obstruction of the passages, both components are generally provided in a highly flowable form and are circulated by pumps or the like through the control plunger, piston or ram in one position of the latter, entering the mixing chamber only after retraction of this control member into another position.

It is also important, to avoid the need to clear out solidified product and to permit reuse of the head, to provide the plunger, piston or ram, so that it completely expels the reaction mixture from the mixing chamber.

It has already been noted that this mixing chamber can open directly into a mold or another vessel.

It has been found, in some cases, to be advantageous to discharge this chamber into a duct leading to a mold and at substantially right angles to the mixing chamber, this duct being provided in turn with a second piston, plunger or ram to drive the mixture out of the channel. Particular reference may be had to U.S. Pat. No. 3,975,128 and the German Pat. No. 23 27 269 in this regard.

Both of these publications deal with a high pressure mixing head in which the additional channel has the effect of quieting the highly turbulent mixture driven from the mixing chamber into this channel. The quieting channel is comparatively narrow and long and the second piston serves to clear the channel at the end of each mixing phase and thus prevent the channel from being plugged up by the reacting mixture. It is known in other mixing heads to control the pressure in the mixing chamber and to regulate the precise metering or rejection of the material, especially with small dispensed quantities per operation (e.g. several grams per cycle), by providing movable displacement bodies in the mixing chamber itself (see German Pat. No. 20 65 841 and printed German patent application-Auslegeschrift 26 12 812) or downstream of the mixing chamber in the discharge passage (printed German patent application-Auslegeschrift No. 25 44 749). These systems, however, have various disadvantages. For example, some of them may be excessively space-consuming and large for many purposes, and can be expensive and difficult to handle. Others are difficult to control and control systems for them may be expensive. Still others cannot be readily repaired or maintained.

In general, they have not been fully satisfactory.

Objects of the Invention

It is the principal object of the present invention to provide an improved mixing head for the purposes described which will obviate the disadvantages of earlier mixing heads as developed above.

Yet another object of this invention is to provide a mixing head with the advantages of the mixing head of the commonly owned U.S. Pat. No. 3,975,128 and German Pat. No. 23 27 269 but which can be operated with greater precision with respect to the metering of small quantities of the reaction mixture therefrom.

Summary of the Invention

These objects and others which will become apparent hereinafter are attained in accordance with the present invention in which the system of U.S. Pat. No. 3,975,128 is modified so that directly at the mixing chamber outlet opening, a filler body is provided and partly obstructs the outlet opening for the mixing chamber in the discharge phase, i.e. while the mixture is forced by the first plunger from the mixing chamber into a channel at right angles thereto.

This is achieved, according to the invention, by providing a stop for the second piston, which is adjustable, to control the degree of obstruction of the mixing chamber opening, and which holds the piston so that a predetermined amount of the free end of the piston or plunger projects across the mixing chamber opening, or, put otherwise, the obstructing body lies at a preferably adjustable location downstream of the mixing chamber opening.

It should thus be apparent that the second piston or plunger has, in addition to its final or cleaning function, the additional function of serving as a filler body which partially fills the flow passage for the mixture and constitutes there a body of predetermined but adjustable volume.

Obviously this arrangement eliminates the need for a separate filling body, means for positioning the filling body or means for adjusting the filling body.

The mixing head thus has comparatively small dimensions. It has been found to be advantageous, moreover, to provide the filling body so that it lies directly downstream of the mouth of the opening of the mixing chamber and thus also affects the pressure relationships in the mixing chamber and in the channel or exclusively in the mixing chamber by a selective or partial obstruction thereof.

According to a feature of the invention, the obstructing body has an adjustable stop which can limit the displacement of the second piston in its retracted position. This adjustable stop can be a screw or the like. This arrangement has the advantage that it provides extremely simple means for setting the throttling position of the obstructing body.

According to yet another feature of the invention, the second piston is displaceable by fluid pressure between its forward and retracted positions, and the abutment is so arranged that it engages directly a fluid-pressurizeable surface of the second piston.

According to yet another feature of the invention, between the second piston and its actuator, i.e. a working piston, a device is provided for the selective displacement of the second piston relative to the actuating member so that the maximum stroke of the second piston is substantially equal to the length in the direction of this stroke of the mixing chamber outlet opening. This adjustment means can be a hydraulically actuated device working against the force of a spring with the force being effective in the direction of the forward position of the second piston.

Furthermore, between the second piston and the abutment of the actuating member, i.e. the working piston, a stroke is provided which can be equal to the displacement of the second piston, the latter being formed with a lifting piston pressurizeable by the medium in the direction of the retracted position of the second piston or plunger.

This latter means enables, in spite of the setting of a predetermined degree of obstruction of the mixing chamber outlet opening, a retraction of the second piston or plunger so that it can completely clear this opening, thereby allowing mixture residues to be completely stripped from the system and even from the surfaces of the member acting as the obstruction.

These residues can then be expelled with the remaining portion of the mixture at the end of the mixing phase.

The complete retracted position of the second piston or plunger also permits penetration of the first piston or plunger into the channel.

In the process of the invention, i.e. the process for operating the device described, the mixing phase finds both of the pistons retracted, the first or mixing piston being fully retracted or the second or control piston being partially retracted so that its leading end projects beyond the boundary of the mixing chamber opening and forms an obstruction as previously described. At the end of the mixing phase, the first piston is advanced to drive the mixture out of the mixing chamber, and upon reaching the end of the mouth or opening thereof the second piston is retracted slightly for stripping of the residues and then is advanced fully to drive the mixture out of the channel.

Brief Description of the Drawing

The above and other objects, features and advantages of the present invention will become more readily apparent from the following description, reference being made to the accompanying drawing in which:

FIG. 1 is a cross section through a mixing head according to the invention; and

FIG. 2 is a detailed view of the relationship between the plungers in another embodiment of this invention.

Specific Description

The mixing heads shown in FIGS. 1 and 2 operate in the manner described in U.S. Pat. No. 3,975,128 except with respect to the obstruction function of the leading end of the second plunger 14 or 38. This obstructing function has been illustrated in FIG. 2 but is not visible in FIG. 1, where this plunger has been shown advanced to clear the channel. Nevertheless, in a fully expanded state of the spring 28 when the working piston member 3c engages the abutment 26, the leading end 15 of plunger 14 will project beyond the boundary of the mouth of the mixing chamber 1 to partly obstruct the latter as shown in FIG. 2.

The mixing chamber 1 is used to produce a polyurethane mixture of two synthetic resin components, namely, a polyisocyanate and a polyol, these two components being circulated by respective pumps (see U.S. Pat. No. 3,975,128) and controlled by the element 2.

The right hand end element 2 is formed as a first plunger 3 connected to a piston 4 axially displaceable in a hydraulic cylinder 4a, upon the delivery of fluid to the port 4b of a compartment 4c or one side of the piston 4. Another port, 4d, of a compartment 4e on the opposite side of the piston can also be pressurized for retraction of the piston.

The plunger 3 is provided with a pair of bypass passages 21 and 22 respectively connecting the ports 9 and 11 and the ports 8 and 10 when the plunger 3 is advanced to the right so that the two components can be circulated through the mixing head.

Upon retraction of the piston 4 and hence the plunger 3, the end face 7 of the plunger 3 is set back beyond the ports 8 and 9 so that intensive mixing of the two streams of reactive components, directed at one another radially from the oppositely moving ports, occurs in the chamber. During this mixing phase, moreover, the plunger 14 in the channel 12 at a right angle to the mixing chamber is retracted and the mixture flows out of the outlet 5 into this channel.

The channel 12, as described in U.S. Pat. No. 3,975,128, serves as a quieting channel at an angle of 90° to the axis of the mixing chamber, and opens at its mouth 20 into a mold or space to be filled with polyurethane.

The end face of the plunger 3 and the configuration of the opening 5 are shaped to conform to the shape of the channel 12 and the plunger 14 in this region.

In the embodiment illustrated in FIG. 1, channel 12 and plunger 14, have semicircular cross sections in this region.

According to the invention, the plunger 14 can be retracted beyond the boundary of opening 5 to completely clear the latter or can project beyond the edge of this opening so as to partially obstruct the outlfow. In the position shown, i.e. the fully advanced position of plunger 14, the latter drives any residues out of the channel 12 and has its end face 17 flush with the end of the housing 20. The portion of this plunger which acts as an obstruction for the opening 5 has been represented at 15.

The second plunger 14 is coupled to a working piston 13.

The cylinder 19 is connected to the housing end 20 via a neck 18. The hydraulic control system for the piston 13 can be that described in U.S. Pat. No. 3,975,128.

The cylinder housing 19 can be closed by a cover 23 provided with a screw 24 which can be locked by a nut 25 after setting from the exterior so that the inner end 26 of this screw forms the aforementioned abutment which is adjustable to set the upper end position for the piston 13.

The maximum degree of adjustability of the screw 24 should be the length equal to the length of the opening 5 in the direction of displacement of the plunger 14.

The plunger 14 is connected by a cylindrical rod 16 to the piston 13 and is axially displaceable therein against the force of a spring 28 while having a head 35 which can be biased hydraulically.

The spring 28 is of the dish-disk type formed by a stack of Belleville washers.

While the screw 24 sets the normal retracted position of the piston 13 and hence the degreee to which the end 15 of plunger 14 overhangs the mouth 5 of the mixing chamber 1 to act as an obstruction, it is desirable to allow full retraction of the end 15 beyond the boundaries of the opening 5 for clearing of residues and the like.

To this end, between the connecting rod 16 and the working piston 13, a shifting device 27 is provided, this device having been partially described previously.

The end of the piston 19 is formed with a cover 30 provided with an axially extending pin 29 inwardly to form a stop engageable by the head 35 on the rod.

The spring 28 is placed between members 30 and 35, and ports 32 and 36 permit communication of hydraulic fluid from respective compartments of cylinder 29 to corresponding sides of the head 35.

Consequently, when fluid is delivered via port 33 and discharged via port 31, the piston 13 is moved downwardly and the force of this fluid together with the force of the spring 28 ensures that the plunger 14 will be fully displaced out of the piston 13. Conversely, when fluid is delivered under pressure through port 31 and port 33 is drained, the piston 13 will be displaced in the direction of abutment 26 and while spring 28 holds the plunger 14 fully extended. When the piston 13 engages the abutment 26, however, and is then immobilized thereby, in the position in which the obstruction 15 is effective, increase in pressure delivered to port 31 can drive the head 35 upwardly and retract the plunger 14 the rest of the way to completely clear the outlet 5.

Of course, when pressure is applied to the port 33, the plunger 14 is driven downwardly to drive out any residues from the channel. Passages 36 and 37 also form linkage paths for any fluids which may pass the head 35.

In operation, the piston 13 is retracted against the abutment 26 but plunger 14 is fully extended so that the end 15 forms a partial obstruction for the outlet 5 as previously described.

The plunger 3 is fully retracted as well as the two components in chamber 1 mix and are forced past the obstruction 15 through the outlet 5 and into the channel 12 whence the mixture flows to the desired region. At the end of the polyurethane application step, the plunger 3 is driven to the right to drive any residues out of the mixing chamber 1, the plunger 14 is retracted slightly to completely clear the outlet 5, and is then advanced to drive all residues out of the channel 12.

FIG. 2 illustrates another embodiment of the invention wherein the first plunger 3' has a cylindrically concave end face 7' of a radius curvature corresponding to the cylindrical end 40 of the plunger 38. In this case, the plunger 4c and the channel 39 have larger diameter circular cross sections and the quieting effect is somewhat greater. In the throttle position the end 40 of plunger 38 can obstruct more than half of the flow cross section of the outlet 5' from the mixing chamber 1'.

We claim:

1. A mixing head for two reactive components comprising: means forming:
 - an elongated mixing chamber provided with ports for introducing said components into said mixing chamber, and an outlet opening at one end of said mixing chamber;
 - a first plunger shiftable in said mixing chamber between a retracted position in which a mixture of said components is formed therein, and a second position wherein said first plunger is advanced to said opening to drive said mixture from said chamber;
 - means forming an elongated quieting channel communicating with said mixing chamber at said opening and having a discharge end;
 - a second plunger shiftable in said channel between a retracted position wherein said mixture can be discharged through said channel, and an advanced position wherein said second plunger drives said mixture from said channel; and
 - means for positioning at least one end of said second plunger across said opening in said retracted position of said second plunger to partially obstruct flow from said mixing chamber into said channel.

2. The mixing head defined in claim 1 wherein the last mentioned means include adjustment means for varying the degree of obstruction of said opening by said end of said second plunger.

3. The mixing head defined in claim 2, further comprising an effective working piston operatively connected to each of said plungers for displacing same.

4. The mixing head defined in claim 3 wherein said adjustment means include a scrw forming an abutment for the working piston of said second plunger.

5. The mixing head defined in claim 4 wherein said scrw engages directly a pressurizeable end face of said working piston of said second plunger.

6. The mixing head defined in claim 3, further comprising displacement means between said working piston of said second plunger and said second plunger, said displacement means enabling relative displacement of the second plunger and its working piston through a distance at least equal to the length of said opening in the direction of displacement of said second plunger.

7. The mixing head defined in claim 6 wherein said displacement means include a spring bearing in opposite directions of said second plunger and its working piston, and hydraulic means for displacing said second plunger relative to its working piston.

8. The mixing head defined in claim 7 wherein the working piston of said second plunger is provided with an abutment defining a stroke h for a piston head connected to said plunger.

9. A method of operating a mixing head of the type wherein, in an advanced position of a first control plunger the reactive components are circulated through said first plunger, said first plunger is retracted to permit said components to mix in a mixing chamber and discharge from said mixing chamber through an opening at an end thereof into a channel at a right angle to said mixing chamber in a retracted position of a second plunger in said channel, said method comprising:
 - disposing a leading end of said second plunger in line with said opening so as to obstruct said opening partially during the flow of the mixture from said chamber to said channel;
 - thereafter advancing said first plunger to drive said mixture from said mixing chamber;
 - retracting said second plunger to completely clear said opening and permit residues to be discharged from said mixing chamber; and
 - advancing said second plunger to drive residues of said mixture from said channel.

* * * * *

Notice of Adverse Decision in Interference

In Interference No. 101,472, involving Patent No. 4,464,056, H. Schmitz and W. Krompass, MIXING HEAD FOR REACTIVE MATERIALS, final judgment adverse to the patentees was rendered June 17, 1986, as to claims 1-6 and 9.
[*Official Gazette December 2, 1986.*]